United States Patent [19]

Budjinski et al.

[11] Patent Number: 5,342,657

[45] Date of Patent: Aug. 30, 1994

[54] APPARATUS AND METHOD FOR APPLYING FLUID TO A MOVING CONTINUOUS WEB

[75] Inventors: Joseph F. Budjinski, Quinton; Steven M. Campbell, Richmond; E. Theodore Ward, Hampton, all of Va.

[73] Assignee: Philip Morris Incorporated, New York, N.Y.

[21] Appl. No.: 976,616

[22] Filed: Nov. 16, 1992

[51] Int. Cl.⁵ ............................................. A24D 3/00
[52] U.S. Cl. ..................... 427/424; 118/325; 118/326
[58] Field of Search ................. 427/424; 118/325, 326

[56] References Cited

U.S. PATENT DOCUMENTS

| | | | |
|---|---|---|---|
| 4,132,189 | 1/1979 | Greve et al. | 118/325 |
| 4,368,688 | 1/1983 | Grumer et al. | 118/325 |
| 4,582,732 | 4/1986 | Arthur | 427/424 |

*Primary Examiner*—Asok Pal
*Attorney, Agent, or Firm*—Kevin B. Osborne; James E. Schardt; Charles E. B. Glenn

[57] ABSTRACT

Apparatus and method for applying a fluid to a moving continuous web whereby fluid is collected and stored in a multichamber cylinder when application of fluid to the web is ceased, and substantially all of the fluid collected and stored is promptly and directly retrieved from the multichamber cylinder after application of fluid to the moving continuous web has recommenced. A storage chamber of the multichamber is sized to receive an amount of fluid such that the fluid level is below the bristles of an applicator brush.

7 Claims, 5 Drawing Sheets

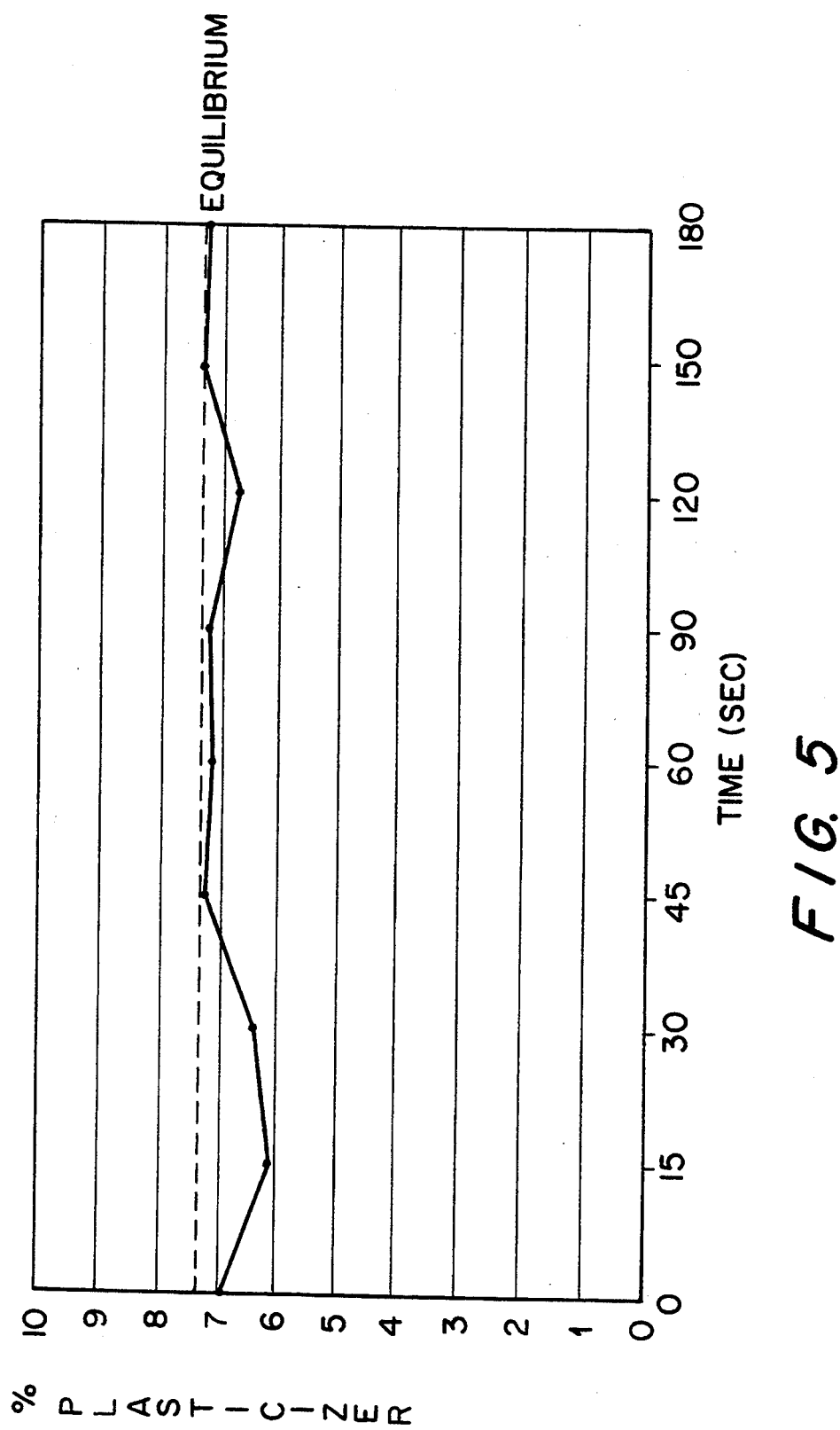

APPARATUS AND METHOD FOR APPLYING FLUID TO A MOVING CONTINUOUS WEB

BACKGROUND OF THE INVENTION

The present invention relates to an apparatus and method for applying a fluid to a moving continuous web. More particularly, the present invention relates to manufacturing cigarette filter plugs in which a moving continuous web of filter tow is coated with plasticizer using an apparatus including a multichamber cylinder control system. Known cigarette filter plug manufacturing machines may be modified to practice the present invention by removing or disabling the existing equilibrium control apparatus and adding apparatus as required for the multichamber cylinder control of the present invention.

Filter plug making machines are widely used in high speed cigarette manufacturing operations. In typical commercial filter plug makers, such as the model AF-1 made by Hauni-Werke Korber & Co AG (Hamburg, Germany), filter tow is supplied as a moving continuous web. The filter tow web is directed into an enclosed spray booth where a plasticizer, typically triacetin, is applied to the tow as a mist. The plasticizer mist is created by the spray of a spinning applicator brush. Liquid plasticizer is concurrently applied to the applicator brush through two sources: a nozzle apparatus that feeds liquid plasticizer pumped from a remote tank directly onto the applicator brush, and a reservoir which collects excess or overflow plasticizer and may be in contact with the applicator brush, depending on the level of plasticizer in the reservoir.

In the known apparatus, the applicator brush spins and picks up plasticizer from the nozzle and the reservoir. The spinning motion of the brush causes the plasticizer that has been picked up by the brush to be sprayed as a mist onto the tow passing through the spray booth. Excess plasticizer drains back into the reservoir. Equilibrium is reached when the level of plasticizer in the reservoir is constant and the rate at which plasticizer is applied to the tow is generally equal to the rate at which plasticizer is being pumped into the spray booth.

When a filter plug making machine is stopped and restarted, the renewed spinning action of the applicator brush upon start-up can create a splash from the reservoir which can damage the tow or cause it to break or wrap around the roller mechanism which transports it. This leads to a waste of tow, loss of production time, and wear and tear on the machinery.

In order to avoid splashing when a filter plug making machine is stopped and then restarted, known apparatus, such as the AF-1, drain plasticizer from the spray booth reservoir whenever the machine is stopped. In the AF-1, a 15 cc drainage cylinder and drain valve arrangement is used. When the AF-1 is shut down, approximately 30 cc of plasticizer is drained from the reservoir, lowering the level of plasticizer in the reservoir to a short distance, typically 1 mm, below the applicator brush. A portion of this plasticizer drained from the reservoir is drawn into the 15 cc drainage cylinder and the remainder is emptied out through the drain valve back to the remote tank to which the nozzle is connected. When the AF-1 is restarted, the level of plasticizer in the reservoir is below the applicator brush and the applicator brush cannot pick up plasticizer from the reservoir. Filter tow starts passing through the spray booth, however, before plasticizer is applied.

Although the plasticizer collected by the 15 cc cylinder is returned directly to the reservoir, this is only a fraction of the entire reservoir capacity and the level of plasticizer in the reservoir following start-up is below the applicator brush. Additional plasticizer must be pumped into the system from an outside source before the applicator brush contacts the plasticizer in the reservoir and equilibrium is established. Typically it takes more than one minute from start-up for the known machines to replace the plasticizer lost and to reach the desired level for the plasticizer to be in contact with the applicator brush.

It is therefore a disadvantage of known filter plug making machines that only a portion of the plasticizer collected from the reservoir when the machine is switched off is returned directly into the spray booth when the machine is restarted.

Another disadvantage of known filter plug making machines is that a delay is experienced when starting-up the machine until sufficient fresh plasticizer has been pumped back into the spray booth through the nozzle to compensate for the plasticizer that has been drained out of the spray booth as a result of previously switching the machine off.

A further disadvantage of known filter plug making machines is that filter tow is wasted upon start-up because of the time required to reach equilibrium after start-up.

SUMMARY OF THE INVENTION

The present invention alleviates to a great extent the disadvantages of the prior art by providing a machine for applying a fluid to a continuous web that employs a spray booth linked to a multichamber cylinder control system which is activated by a switch system. In the preferred embodiment, which is discussed hereafter, the machine is a filter plug making machine in which a plasticizer is applied to filter tow using an applicator brush.

A multichamber cylinder system is connected by a fluid conveyance means to the reservoir such that when the machine is stopped, plasticizer is drawn from the reservoir into the storage chamber of the multichamber cylinder. This lowers the level of plasticizer in the spray booth to a level below the applicator brush. When application is restarted, the plasticizer is forced out of the storage chamber and immediately returned to the spray booth, preferably through a flute dispenser. This raises the level of plasticizer in the spray booth back to its original level (i.e, the level of the applicator brush). The amount of plasticizer returned to the spray booth by this means is thus sufficient to promptly restore the fluid level in the reservoir to its functional level.

In a preferred embodiment, a dual piston multichamber cylinder is used. The cylinder has three chambers defined by the position of the dual piston—two air chambers (a shut-down air chamber and a start-up air chamber) and a storage chamber. Movement of the piston is preferably controlled by a solenoid switch which is electrically linked to the motor that drives the applicator brush.

An advantage of the present invention is that it enables stopping and then restarting of the applicator brush without splashing and without delay.

It is a further advantage of the present invention that substantially all of the plasticizer collected from the spray booth is returned directly to the spray booth when the machine is restarted.

It is a yet a further advantage of the present that waste of filter tow is minimized when the applicator brush is restarted after having been stopped.

It is another advantage of the present invention that equilibrium can be reached in the spray booth within seconds of restarting application of plasticizer, thus saving time and reducing the amount of lost tow.

It is, therefore, an objective of the present invention to provide an apparatus and method for applying fluid to a moving continuous web by recycling the plasticizer in the reservoir without causing the fluid to splash onto the web and minimizing the amount of time required to obtain optimal conditions for the application of the fluid to the moving web.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 is a graph showing the percentage of plasticizer applied in a spray booth after start-up according to the present invention.

DETAILED DESCRIPTION OF THE INVENTION

Figure 1:
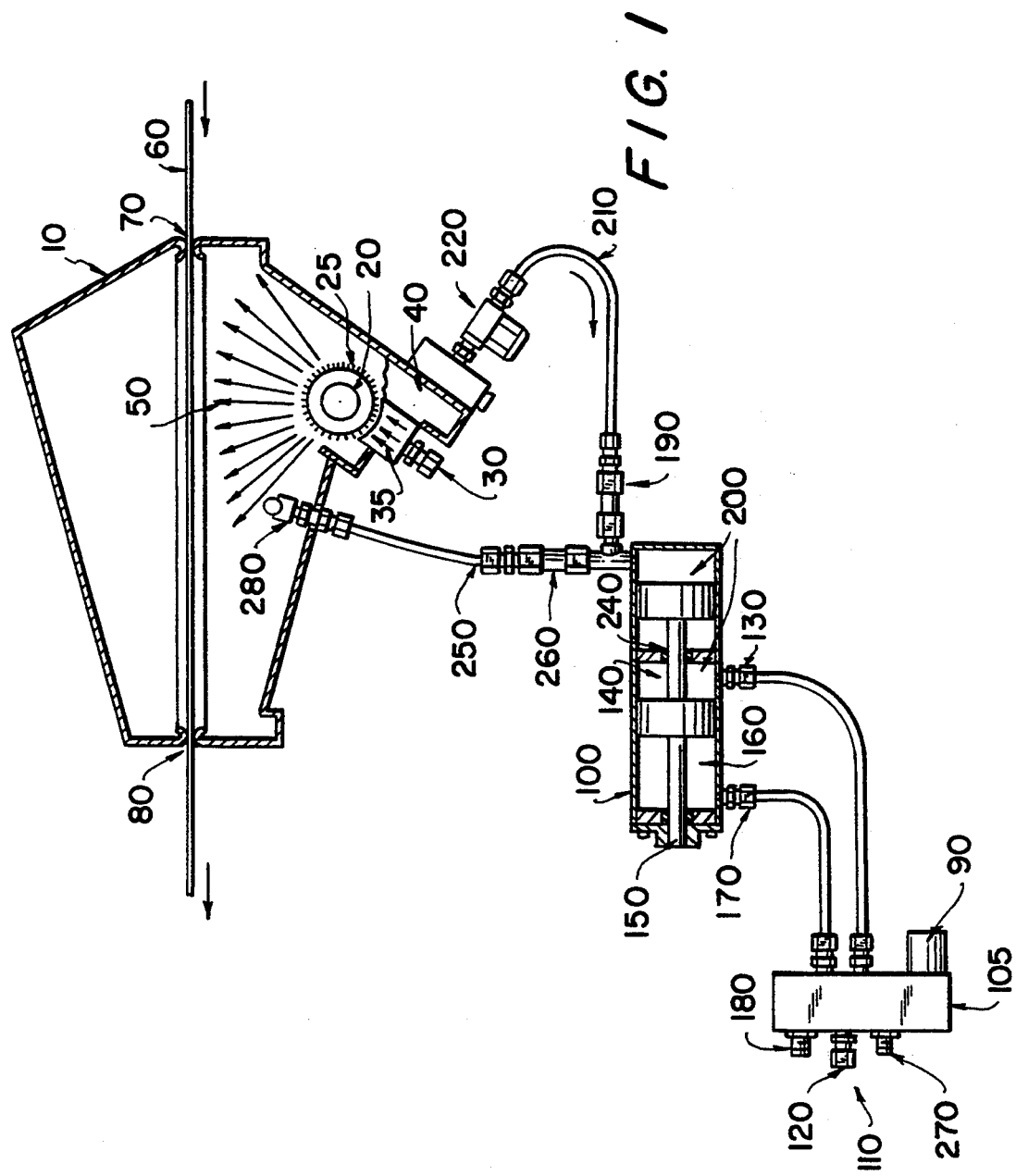
FIG. 1 is a sectional side view of a spray booth and a multichamber cylinder system, according to a preferred embodiment of the present invention.

Referring to FIG. 1, the spray booth 10 has an applicator brush 20 that collects plasticizer from two sources. The first source is a nozzle 30, which applies plasticizer pumped from an external tank source (not shown) directly onto the applicator brush through a set of baffles 35. These baffles ensure that plasticizer is applied evenly onto the length of the applicator brush. The second source is a reservoir 40, located inside the spray booth and adjacent to the applicator brush 20.

The applicator brush 20 is preferably cylindrically-shaped and has a surface for collecting plasticizer consisting of bristles 25 that are mounted to the core of the brush. The applicator brush 20 is connected to a motor (not shown) which causes it to spin. The applicator brush 20 creates a mist 50 in the spray booth 10 by spinning about on its axis and thereby spraying plasticizer collected from the nozzle 30 and the reservoir 40 out radially into the cavern of the spray booth 10. The mist contacts the moving tow 60 which enters the spray booth through aperture 70 and exits the spray booth through aperture 80. These apertures preferably are no wider than necessary to allow free movement of the tow and sufficiently narrow so as to minimize escape of plasticizer from the spray booth.

During operation, an equilibrium condition preferably is maintained whereby the level of plasticizer in the reservoir is kept steady such that the bristles 25 of the applicator brush 20 are in contact with the fluid in the reservoir. At equilibrium, the rate at which plasticizer is applied to the moving tow 60 generally equals the rate at which plasticizer is pumped into the spray booth through nozzle 30. Excess spray drains into the reservoir 40 where it is picked up again by the bristles 25 of the spinning applicator brush 20.

The amount of plasticizer pumped into the spray booth through the nozzle 30 is proportional to machine speed. As machine speed increases, a greater amount of plasticizer is introduced into the spray booth through the nozzle 30. The applicator brush is preferably kept spinning at a constant speed, regardless of machine speed, in order to maintain a constant mist density.

It often is necessary to stop and re-start filter plug making machines—e.g., for maintenance or material supply. In order to prevent splashing when the machine is restarted after having been stopped, plasticizer is collected from the reservoir 40 through the action of a multichamber cylinder 100.

Figure 2:
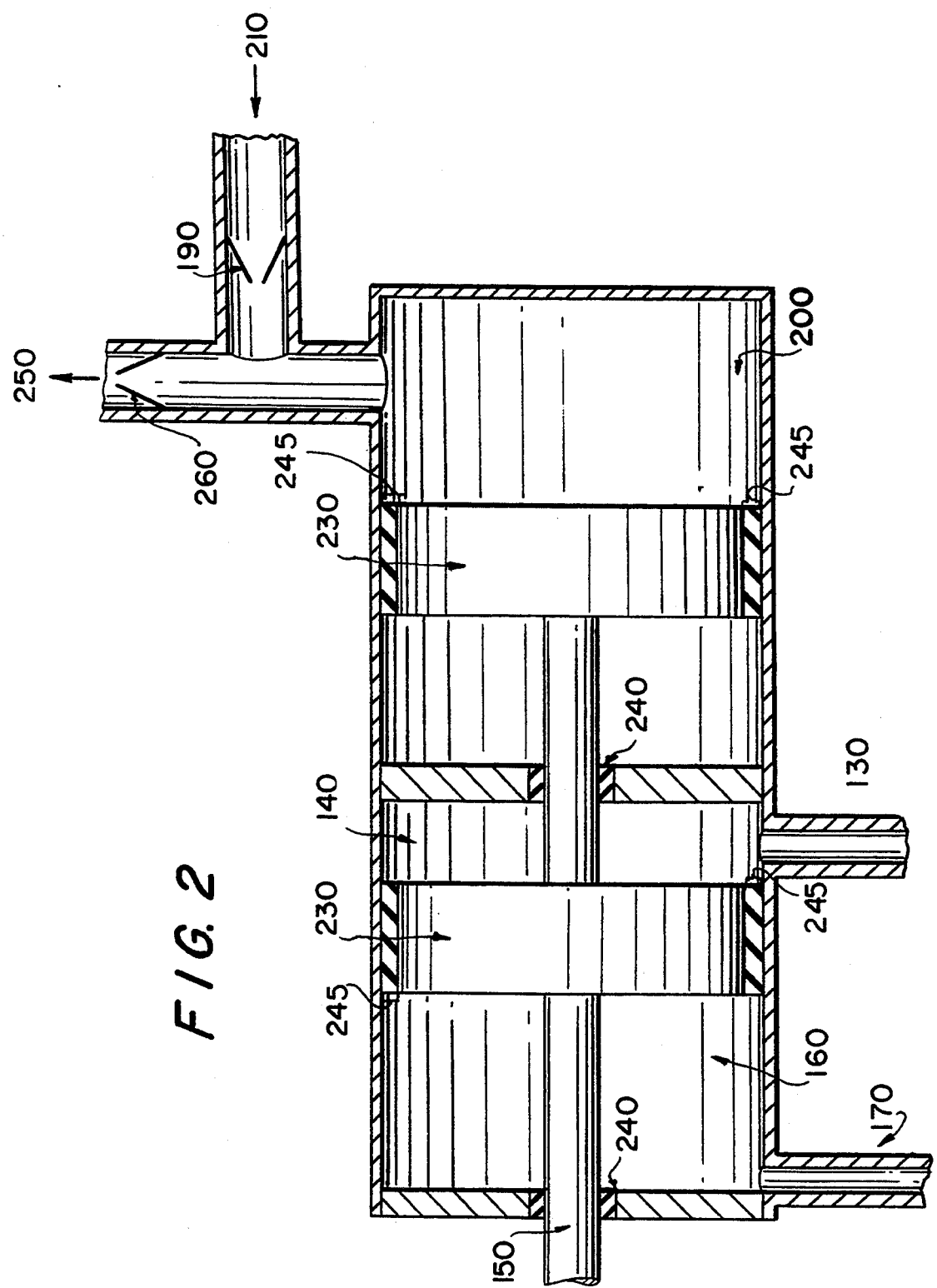
FIG. 2 is a cross-section of a dual piston multichamber cylinder, according to a preferred embodiment of the present invention.

In a preferred embodiment, referring to FIG. 2, a dual piston multichamber cylinder 100 is used. The cylinder comprises a piston-piston assembly 150 with two piston heads 230 separated by air-tight seals 240. The circumference of each piston head is also lined with air-tight sealing material 245. The air-tight seals 240 and sealing material 245 preferably consist of a rubber material which is non-reactive with plasticizer fluid (e.g., ethylene-propylene or silicone).

The dual piston multichamber cylinder 100 contains three separate chambers defined by the position of the piston heads 230 of the piston-piston assemblage 150 within the cylinder. These chambers are a shut-down chamber 140, a start-up chamber 160 and a storage chamber 200.

The multichamber cylinder 100 is controlled by a switch system 105. The switch system 105 activates the multichamber cylinder 100 to draw in plasticizer from the reservoir 40 when the machine is stopped. When the machine is restarted, the switch system 105 triggers the cylinder 100 rapidly to return the plasticizer collected from the reservoir back into the spray booth 10. Preferably, the plasticizer drawn from the reservoir 40 is returned to the spray booth within ten seconds.

In a preferred embodiment, the switch system 105 is synchronous with the motor that causes the applicator brush 20 to spin. When the applicator brush motor is stopped, the switch system 105 activates the cylinder 100 to draw plasticizer in from the reservoir 40. When the applicator brush motor is restarted, the switch system 105 triggers the cylinder 100 to restore the plasticizer to the spray booth. The switch system 105 preferably comprises an electrically-activated solenoid 90 electrically connected to the applicator brush motor. The solenoid 90 controls the multichamber cylinder 100 and is connected to an air source through valve 110. When the applicator brush motor is stopped, the solenoid switches, supplying air through valve 120 into port 130.

When air is supplied into port 130, pressure builds in the shut-down chamber 140 of the dual piston multichamber cylinder 100. This increase in pressure causes the piston-piston rod assembly 150 to shift into a down-stroke position. Air is forced out of the start-up chamber 160 through port 170 and out exhaust valve 180. The movement of the piston-piston rod assembly 150 opens check valve 190 and draws plasticizer into the storage chamber 200 of the multichamber cylinder 100.

The plasticizer travels through tubing 210 from the reservoir 40 via an in-line filter 220, which prevents particles and dirt from entering and damaging the multichamber cylinder 100. When the shut-down chamber 140 is thus expanded and plasticizer is drawn into the storage chamber 200 of the dual piston multichamber cylinder 100, the level of the reservoir 40 in the spray booth sinks below the level of the applicator brush 20.

Figure 3:
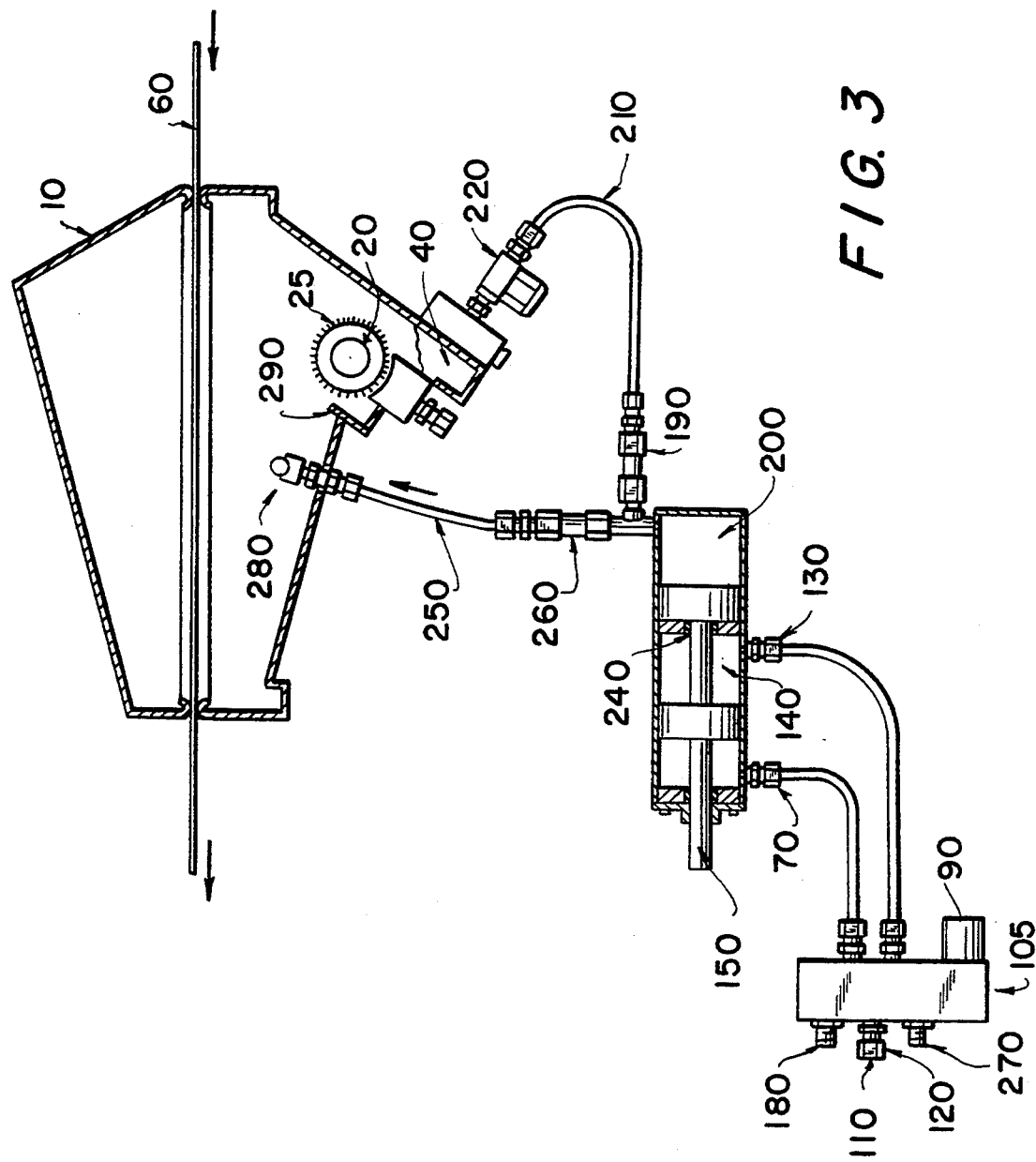
FIG. 3 is a sectional side view of a spray booth and a multichamber cylinder system when fluid application has been stopped, according to a preferred embodiment of the present invention.

Referring to FIG. 3, when application of plasticizer is restarted, the solenoid 90 switches back to its original position, supplying air to port 170. This builds pressure in the start-up chamber 160 of the dual piston multichamber cylinder 100 and causes the piston-piston rod assembly 150 to shift back to its original position. The movement of the rod assembly causes the shut-down chamber 140 to close, expelling air from the chamber through port 130 and out exhaust valve 270. The movement of the piston-piston rod assembly 150 also causes the storage chamber 200 to close, forcing plasticizer out of the storage chamber 200 and into the spray booth 10 through tubing 250, via check valve 260. The plasticizer is returned in the spray booth via a return flute 280.

The amount of plasticizer drawn into the multichamber cylinder 100 when the machine is stopped equals the amount of plasticizer expelled from the multichamber cylinder 100 when the machine is restarted. If the machine is operating in equilibrium condition when stopped, the amount of plasticizer returned to the spray booth 10 will restore the reservoir to equilibrium level such that the bristles 25 of the applicator brush 30 are once again in contact with the fluid in the reservoir 40.

Figure 4:
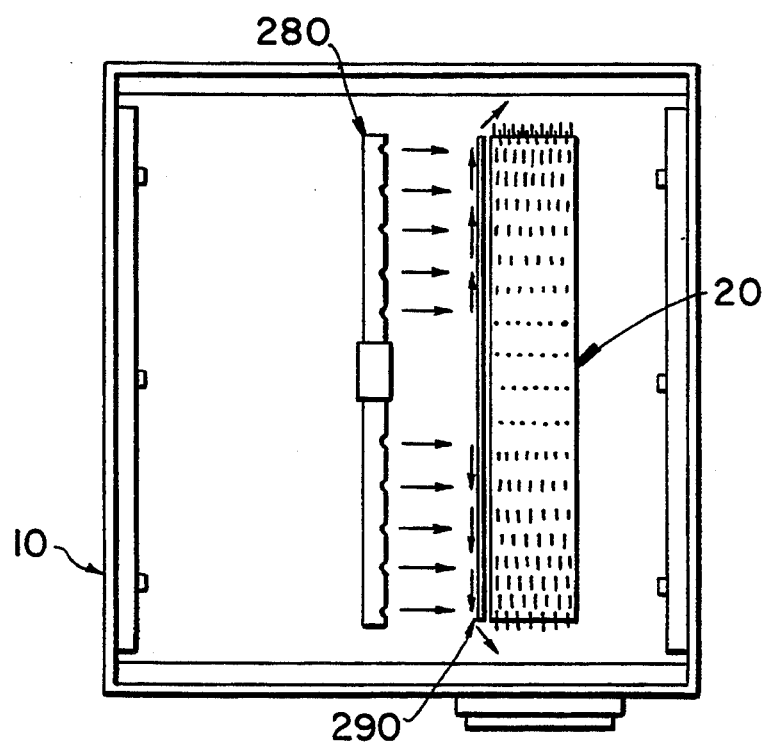
FIG. 4 is a top view of a spray booth according to a preferred embodiment of the present invention.

Referring to FIG. 4, the return flute comprises a plurality of holes through which the plasticizer flows out into the spray booth. A protective side plate 290 lies above the applicator brush and prevents plasticizer from dripping directly onto the spinning applicator brush. The presence of the protective side plate causes the plasticizer to flow around the edges of the spinning applicator brush 20 before returning to the reservoir 40. The desired amount of plasticizer is applied to the moving filter tow promptly after start-up without causing a splash.

EXAMPLE

An AF-1 Hauni machine was modified in line with the detailed description given above and in accordance with the present invention. When using triacetin as a plasticizer, it was found that the proper amount of plasticizer was applied to the tow almost instantly when plasticizer application was stopped and then restarted. No splashing was observed. Sample plugs of tow were taken following re-start of the machine and measured for triacetin. As shown in FIG. 5, the desired level of plasticizer was reached as soon as the machine was switched on, and equilibrium was maintained until the machine was switched off again.

A standard AF-1 Hauni commercial filter plug maker using triacetin as plasticizer was observed to take 1.5 to 3.0 minutes before the proper amount of acetate began to be applied to the tow, whenever application was stopped and then restarted.

Thus, it is seen that an apparatus and method for applying a fluid to a moving continuous web is provided, whereby the desired amount of fluid is applied promptly after start-up, without wasting tow and without causing a splash. One skilled in the art will appreciate that the present invention can be practiced by other than the preferred embodiments which are presented for purposes of illustration and not of limitation, and the present invention is limited only by the claims which follow.

What is claimed is:

1. An apparatus for applying a fluid to a moving continuous web comprising:
    a spray chamber;
    a spray means mounted within said spray chamber, said spray means comprising an applicator brush, said applicator brush comprising a plurality of bristles;
    a fluid reservoir adjacent to said spray means within said spray chamber;
    a first conduit;
    a storage chamber connected to said fluid reservoir by said first conduit, said first conduit being capable of conveying fluid from said fluid reservoir to said storage chamber, said storage chamber sized to receive an amount of fluid from said fluid reservoir such that the level of fluid remaining in said fluid reservoir is below the bristles of said applicator brush;
    a second conduit for conveying fluid from said storage chamber to said spray chamber; and
    a switch system means for drawing fluid from said fluid reservoir into said storage chamber through said first conduit when said applicator brush is stopped and for forcing substantially all fluid in said storage chamber from said storage chamber, through said second conduit and to said fluid reservoir when said applicator brush is started.

2. The apparatus of claim 1, further comprising a flute, wherein said flute is mounted within said spray chamber such that it receives fluid conveyed through said second conduit, said flute comprising a plurality of holes through which fluid can flow into said spray chamber from said second conduit.

3. The apparatus of claim 1, wherein the bristles of said applicator brush are in functional contact with fluid stored in said fluid reservoir while said applicator brush is operating.

4. The apparatus of claim 1, wherein an equilibrium condition is attained within 10 seconds of starting said applicator brush.

5. The apparatus of claim 2, wherein said flute is mounted within said spray chamber above a level of fluid remaining in said fluid reservoir after said applicator brush is stopped, the fluid level being below the bristles of said applicator brush after said applicator brush is stopped.

6. The apparatus of claim 1, further comprising a multichamber cylinder system which comprises a cylinder and first and second pistons located within said cylinder and separated from each other via respective seals, said first and second pistons dividing said cylinder into said storage chamber, a start-up chamber, and a shut-down chamber; wherein said switch system means actuates said first and second pistons to move to expand said shut-down chamber and said storage chamber and correspondingly close said start-up chamber when said applicator brush is stopped to draw fluid from said fluid reservoir into said storage chamber, and wherein said switch system means actuates said first and second pistons to move to expand said start-up chamber and correspondingly close said shut-down chamber and said storage chamber to force substantially all of the fluid in said storage chamber to said fluid reservoir when said applicator brush is started.

7. The apparatus of claim 6, further comprising means for selectively supplying air to either said start-up chamber or said shut-down chamber and for correspondingly selectively releasing air from either said shut-down chamber or said start-up chamber, said switch system means controlling said means for selectively supplying air.

* * * * *